United States Patent

[11] 3,615,216

[72] Inventor Clyde L. Aldridge
 Baton Rouge, La.
[21] Appl. No. 715,948
[22] Filed Mar. 26, 1968
[45] Patented Oct. 26, 1971
[73] Assignee Esso Research and Engineering Company

[54] WATER GAS SHIFT PROCESS FOR PRODUCING HYDROGEN USING A CESIUM COMPOUND CATALYST
7 Claims, No Drawings

[52] U.S. Cl. ..................................... 23/213,
 252/373, 252/431, 252/443, 252/476
[51] Int. Cl. ....................................... C01b 1/02,
 C01b 1/03
[50] Field of Search .......................... 23/213;
 252/373, 476, 455

[56] References Cited
UNITED STATES PATENTS

| | | | |
|---|---|---|---|
| 3,170,758 | 2/1965 | Honerkamp .................. | 23/213 X |
| 3,291,564 | 12/1966 | Kearby ........................ | 252/476 X |
| 3,303,001 | 2/1967 | Dienes ......................... | 23/213 |
| 3,388,972 | 6/1968 | Reitmeier et al. ............ | 23/213 |
| 3,442,795 | 5/1969 | Kerr et al. .................... | 252/455 X |

Primary Examiner—Edward Stern
Attorneys—Pearlman and Stahl and C. D. Stores

ABSTRACT: Cesium salts derived from acids having an ionization constant below $1 \times 10^{13}$ and carried on a support having high-surface area are used to catalyze the reaction $$CO + H_2O \leftrightarrows CO_2 + H_2$$

at temperatures between 400° and 700° F.

WATER GAS SHIFT PROCESS FOR PRODUCING HYDROGEN USING A CESIUM COMPOUND CATALYST

BACKGROUND

The present invention relates to the preparation of hydrogen from carbonaceous materials in accordance with the equations $$C + H_2O \leftrightarrows CO + H_2$$

$$CO + H_2O \leftrightarrows CO_2 + H_2$$

It is well known to prepare hydrogen by reacting carbonaceous materials, such as hydrocarbons with steam at elevated temperatures of 1,200°–1,400° F. or coal or coke with steam at temperatures up to 2,500° F. and then to react the resulting mixture of CO and $H_2$ with more steam at lower temperatures, for example at 800°–900° F. in the presence of suitable catalysts to convert the carbon monoxide produced in the first stage to carbon dioxide and additional hydrogen. The second step, known as the water gas shift reaction is limited by equilibrium considerations and complete conversion of CO to $CO_2$ is not realized. However, the concentration of CO in the product when equilibrium is reached is directly proportional to the temperature. Consequently conversions can be increased by either removing the carbon dioxide and again contacting the CO and steam with the catalyst in the same or subsequent stages or by lowering the temperature.

The effect of temperature on the equilibrium constant $K = (CO_{2b})(H_2)/(CO)(H_2O)$ is shown in following table.

|  |  | Concentration of CO at Equilibrium (dry basis) Feed* | |
|---|---|---|---|
| °F. | K | A | B |
| 900 | 5.61 | | |
| 800 | 9.03 | 5.19 | |
| 700 | 15.89 | 3.30 | 1.12 |
| 600 | 31.44 | 1.77 | 0.56 |
| 500 | 72.75 | | |

*A–50% of a 1/1 $H_2$/CO mixture +50% $H_2$ (steam) B–30% of a 1/1 $H_2$/CO mixture +70% $H_2O$ (steam).

It is thus evident that less CO will remain unconverted and costly methods of operation will be avoided by operating at as low temperatures as possible, e.g., 400°–700° F., preferably 500°–600° F. Such low temperatures can be employed by the use of a catalyst consisting of copper deposited on zinc oxide. Unfortunately, however, this catalyst will not tolerate any sulfur in the feed at all. Since coal and coke and heavy hydrocarbon feeds suitable for conversion to hydrogen contain appreciable amounts of sulfur which is converted to hydrogen sulfide, and even some small amounts of carbon disulfide and carbonyl sulfide, these feeds are precluded from use with the Cu-ZnO catalyst, and are limited to shift temperatures of 750°–900° F. using a sulfur resistant catalyst such as $Fe_2O_3$ promoted with $Cr_2O_3$. It is also known to use $K_2CO_3$ deposited on activated carbon as a low temperature catalyst (see Erdol u. Kohle V. 6:195 (1953) and V. 9:19 (1956).

SUMMARY

It has now been found that sulfur-containing feeds can be converted to hydrogen economically by means of the water gas shift reaction at temperatures of 400°–700° F. in the presence of cesium compounds derived from acids having ionization constants (pka) below $1 \times 10^13$. Suitable cesium compounds include the carbonate, the bicarbonate, the biphosphate, the aluminate, the hydroxide, the acetate, and the tungstate.

PREFERRED EMBODIMENTS

The first stage reaction in the preparation of hydrogen consists in either reacting coal, coke or heavy feeds at 1,000°–2,500° F. with steam in the absence of catalysts with or without the presence of hydrogen or the reaction of natural gas or other hydrocarbons with steam in the presence of reformer catalysts containing nickel, cobalt, etc., promoted with magnesia, alumina, thoria and similar oxides and supported if desired on an inert base at temperatures of 1,200°–1,400° F. Hydrogen, carbon dioxide and carbon monoxide are obtained with the ratio of CO to $CO_2$ being high.

In accordance with the present invention the second stage or shift reaction, in which the carbon monoxide formed in the first stage, is reacted with more steam at 400°–700° F., preferably at 500°–600° F., is carried out in the presence of a cesium salt of an acid having an ionization constant below $1 \times 10^13$. Any cesium salt may be used which has a low ionization constant but cesium carbonate and the acetate are preferred.

The catalyst is generally supported on a carrier, and preferably one with a high surface area. Although the carrier itself is not critical, it is known for catalysis in general, of course, that activity increases with surface area of the support. Therefore, for maximum benefit the surface area of the carrier should be as high as possible. A particularly suitable carrier is activated charcoal, such as coconut charcoal, Columbia L carbon and the like. Activated alumina may also be used as can silica-aluminas, zeolites, etc.

Pressures used during the shift reaction are not critical but may range from atmospheric to 3,000 p.s.i.g., with 150 to 1,500 p.s.i.g. preferred.

Feed rates are also not critical and may vary from 300 to 3,000 volumes of feed per volume of supported catalyst per hour, (v/v/hr.) measured on the basis of dry gas under standard conditions.

Typical results of operations in accordance with the process of this invention are given in the following examples. It will be evident that these examples are merely illustrative of the invention and no undue limitation is imposed thereby.

EXAMPLE 1

A gas mixture consisting of approximately 25 mol percent hydrogen, 25 mol percent carbon monoxide and 50 mol percent steam was passed at 2,660 v/v/hr. (dry gas basis) over a catalyst consisting of cesium carbonate ($8 \times 10^14$ moles per cc catalyst volume) deposited on various supports at 628°–725° F. under 550 p.s.i.g. The results were compared with $K_2CO_3$ on the same supports and at same moles and concentration at 725° F. The following data were obtained:

| Run No. | Catalyst | Support | T °F. | CO Conversion | Relative Activity |
|---|---|---|---|---|---|
| 1 | $Cs_2CO_3$ | Activated $Al_2O_3$ | 725 | 25.4 | 1.52 |
| 2 | $K_2CO_3$ | Activated $Al_2O_3$ | 725 | 18.7 | 1.00 |
| 3 | $Cs_2CO_3$ | Columbia L Carbon | 725 | 88.3 | 10.00 |
| 4 | $K_2CO_3$ | Columbia L Carbon | 725 | 43.3 | 2.74 |
| 5 | $Cs_2CO_3$ | Coconut Charcoal | 628 | 59.3 | |

The above data show that in all cases cesium compounds are more active than potassium (Run 1 v. Run 2 and Run 3 v. Run 4) and that activated carbon is a more active support than activated alumina (Run 3 v. Run 1).

EXAMPLE 2

A second experiment was carried out using the gas mixture of example 1 in which a comparison is made between operations at 625° F. and 725° F. using $K_2CO_3$ and $Cs_2CO_3$ on Columbia L activated carbon. The following data were obtained:

| Run No. | Catalyst | T °F. | CO Conversion, % | Relative Activity |
|---|---|---|---|---|
| 5 | $K_2CO_3$ | 11 625 | 6.4 | 0.11 |
| 6 | $K_2CO_3$ | 725 | 43.3 | 0.85 |
| 7 | $Cs_2CO_3$ | 625 | 15.9 | 0.28 |
| 8 | $Cs_2CO_3$ | 725 | 88.3 | 3.10 |

The above data show that at 625° F. $Cs_2CO_3$ is 2.5 times as active as $K_2CO_3$ and at 725° F. it is 3.7 times as active.

EXAMPLE 3

Several runs were carried out in which a comparison was made between the effectiveness of $K_2CO_3$ and $Cs_2CO_3$ on Columbia L activated carbon at 625° F., 550 p.s.i.g. and in the shift reaction using a feed containing approximately 25 mol % $H_2$, 25mol % CO, 50 mol % steam and various amounts of $H_2S$ at feed rates of 2,600–2,700 v/v/hr. on the basis of dry gas at standard conditions.

The following data were obtained:

| Run No. | Catalyst | Mole % $H_2S$ in feed | CO Conversion |
|---|---|---|---|
| 9 | $Cs_2CO_3$ | 0 | 20.2 |
| 10 | $Cs_2CO_3$ | 1.4 | 8.0 |
| 11 | $K_2CO_3$ | 0 | 6.4 |
| 12 | $K_2CO_3$ |  | 6.7 |
| 13 | $K_2CO_3$ | 1.4 | 2.9 |

The above data show that $Cs_2CO_3$ is much more effective than $K_2CO_3$ both in the presence and in the absence of sulfur.

The invention having thus been fully described and illustrated, what is claimed as new, useful, and unobvious and desired to be secured by Letters Patent is:

1. A process for preparing hydrogen in high yields which comprises passing a sulfur containing gaseous feed mixture comprising carbon monoxide, hydrogen and steam, in a water-shift reaction, over a sulfur-resistant catalyst selected from the group consisting of cesium carbonate and cesium acetate, said cesium compound being deposited on a support having a high surface area, at a temperature of between 400°–700° F. and at a pressure in the range of from 150 to 3,000 p.s.i.g.

2. The process of claim 1 in which the catalyst is cesium carbonate deposited on activated carbon.

3. The process of claim 1 in which the catalyst is cesium carbonate deposited on activated alumina.

4. The process of claim 1 in which the mixture of carbon monoxide and steam also contains small amounts of hydrogen sulfide as impurity.

5. The process of claim 1 in which the catalyst is cesium acetate deposited on activated carbon.

6. The process of claim 1 in which the catalyst is cesium carbonate on silica-alumina.

7. The process of claim 1 in which the catalyst is cesium carbonate on zeolite.